United States Patent
Nakada et al.

(10) Patent No.: US 12,041,343 B2
(45) Date of Patent: Jul. 16, 2024

(54) UNMANNED AERIAL VEHICLE AND METHOD FOR CONTROLLING UNMANNED AERIAL VEHICLE

(71) Applicant: CANON KABUSHIKI KAISHA, Tokyo (JP)

(72) Inventors: Nobuhiro Nakada, Tokyo (JP); Koichi Sasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 17/843,053

(22) Filed: Jun. 17, 2022

(65) Prior Publication Data
US 2022/0411057 A1    Dec. 29, 2022

(30) Foreign Application Priority Data
Jun. 29, 2021 (JP) ................. 2021-107880

(51) Int. Cl.
  H04N 23/65       (2023.01)
  H04N 23/57       (2023.01)
  H04N 23/63       (2023.01)
  H04N 23/667      (2023.01)
  B64U 10/00       (2023.01)
  B64U 101/30      (2023.01)

(52) U.S. Cl.
  CPC ........... *H04N 23/651* (2023.01); *H04N 23/57* (2023.01); *H04N 23/634* (2023.01); *H04N 23/667* (2023.01); *B64U 10/00* (2023.01); *B64U 2101/30* (2023.01)

(58) Field of Classification Search
  None
  See application file for complete search history.

(56) References Cited

U.S. PATENT DOCUMENTS

| | | | |
|---|---|---|---|
| 8,532,260 B2 | 9/2013 | Takae et al. | |
| 2017/0215832 A1 | 8/2017 | Nagano | |
| 2020/0009970 A1* | 1/2020 | Yi | B60L 15/2045 |
| 2020/0409361 A1* | 12/2020 | Herman | B60W 10/24 |
| 2020/0410873 A1 | 12/2020 | Tachiiwa | |
| 2020/0410876 A1 | 12/2020 | Gremmert et al. | |
| 2022/0242391 A1* | 8/2022 | Mathews, Jr. | H01M 16/006 |
| 2023/0102313 A1* | 3/2023 | Yokoyama | B64C 39/024 348/372 |
| 2023/0322204 A1* | 10/2023 | Telford | B60L 58/40 701/22 |

FOREIGN PATENT DOCUMENTS

JP    2019-041185 A    3/2019

* cited by examiner

*Primary Examiner* — Paul M Berardesca
(74) *Attorney, Agent, or Firm* — Cowan, Liebowitz & Latman, P.C.

(57) ABSTRACT

An unmanned aerial vehicle traveling with an imaging device includes at least one memory and at least one processor which function as: an estimation unit configured to estimate an amount of power consumed by the imaging device and the unmanned aerial vehicle during a time period in which the imaging device and the unmanned aerial vehicle travel from a current location to a target position; and a control unit configured to execute control to give a predetermined notification based on a remaining amount of power of a power supply unit configured to supply power to the imaging device and the unmanned aerial vehicle, and an amount of power consumption estimated by the estimation unit.

12 Claims, 7 Drawing Sheets

STARTING POSITION

UNMANNED AERIAL VEHICLE AND METHOD FOR CONTROLLING UNMANNED AERIAL VEHICLE

BACKGROUND OF THE INVENTION

Field of the Invention

The present disclosure relates to an unmanned aerial vehicle and a method for controlling the unmanned aerial vehicle.

Description of the Related Art

Japanese Patent Application Publication No. 2019-41185 describes a mobile apparatus carrying an imaging device.

When the imaging device takes a video during a travel of the mobile apparatus carrying the imaging device to a destination, power used by the mobile apparatus and imaging device is supplied from a power supply unit of the mobile apparatus.

When this is the case, it is desirable to minimize power consumption of the imaging device to allow the mobile apparatus and imaging device to reach the destination.

SUMMARY OF THE INVENTION

The present disclosure provides a technique that minimizes power consumption of a mobile apparatus.

The unmanned aerial vehicle according to the present disclosure includes at least one memory and at least one processor which function as: an estimation unit configured to estimate an amount of power consumed by the imaging device and the unmanned aerial vehicle during a time period in which the imaging device and the unmanned aerial vehicle travel from a current location to a target position; and a control unit configured to execute control to give a predetermined notification based on a remaining amount of power of a power supply unit configured to supply power to the imaging device and the unmanned aerial vehicle, and an amount of power consumption estimated by the estimation unit.

Further features of the present invention will become apparent from the following description of exemplary embodiments with reference to the attached drawings.

DESCRIPTION OF THE EMBODIMENTS

Embodiments of the present disclosure will be hereinafter described with reference to the drawings. The present disclosure should not be understood as being limited to the following embodiments.

Embodiment 1

Figure 1:
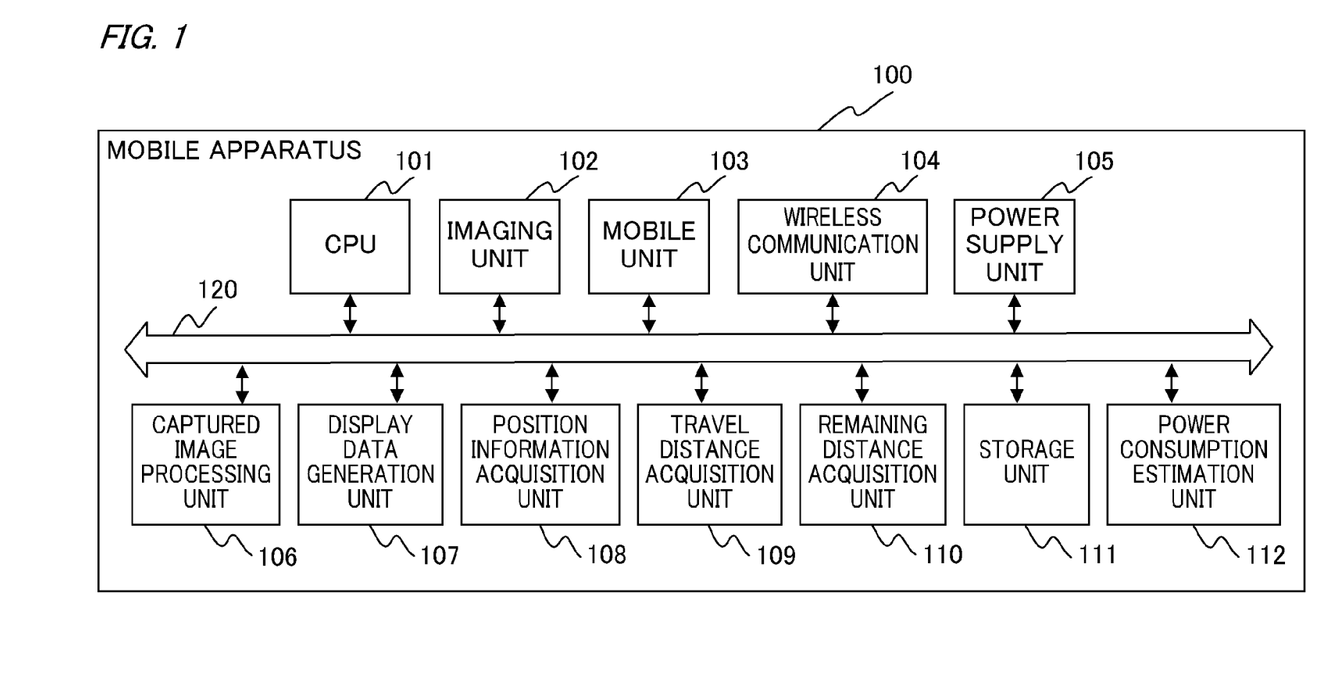
FIG. 1 is a block diagram for explaining a configuration example of a mobile apparatus 100 in Embodiment 1.

FIG. 1 is a block diagram for explaining a configuration example of a mobile apparatus 100 in Embodiment 1. The mobile apparatus 100 is an electronic device that travels with an imaging device, for example. The mobile apparatus 100 is operable as an unmanned aerial vehicle (such as a drone) or a vehicle, for example. While the mobile apparatus 100 described with reference to FIG. 1 is an electronic device that includes an imaging device, the mobile apparatus 100 may be an electronic device that is able to carry an imaging device.

As illustrated in FIG. 1, the mobile apparatus 100 includes a CPU (Central Processing Unit) 101, an imaging unit 102, a mobile unit 103, a wireless communication unit 104, a power supply unit 105, a captured image processing unit 106, and a display data generation unit 107. The mobile apparatus 100 further includes a position information acquisition unit 108, a travel distance acquisition unit 109, a remaining distance acquisition unit 110, a storage unit 111, a power consumption estimation unit 112, and a system bus 120. The imaging unit 102, captured image processing unit 106, and storage unit 111 are also constituent elements of the imaging device incorporated in the mobile apparatus 100. Each constituent element of the mobile apparatus 100 includes an electronic circuit that realizes one or a plurality of functions provided by each constituent element. The constituent elements of the mobile apparatus 100 illustrated in FIG. 1 are each connected to the system bus 120 and are able to communicate with each other via the system bus 120.

In the case where the mobile apparatus 100 is an electronic device capable of carrying an imaging device, the imaging unit 102 and captured image processing unit 106 are not included in the constituent elements of the mobile apparatus 100 and instead are included in the constituent elements of the imaging device carried on the mobile apparatus 100. In the case where the mobile apparatus 100 is an electronic device capable of carrying an imaging device, the CPU 101 is configured to be able to communicate with the constituent elements of the imaging device (including the imaging unit 102, captured image processing unit 106, and storage unit 111) via an USB interface, for example. In the case where the mobile apparatus 100 is an electronic device capable of carrying an imaging device, the power supply unit 105 is configured to be able to supply power to the constituent elements of the imaging device (including the imaging unit 102, captured image processing unit 106 and storage unit 111) via an USB interface, for example.

The CPU 101 is able to control all the constituent elements of the mobile apparatus 100. For example, the CPU 101 includes a memory that stores programs, and a processor (or a micro computer) that controls all the constituent elements of the mobile apparatus 100 by executing the programs stored in the memory. The CPU 101 can also control some or all of the constituent elements of the mobile apparatus 100 based on a control signal generated by a CPU 201 of the control device 200 (control signal for controlling the mobile apparatus 100).

The imaging unit 102 is composed of a lens unit, an imager, an A/D conversion circuit, and so on. The imaging unit 102 performs an imaging process (video imaging process) to generate captured image data (video data) from an object image. Here it is assumed that the imaging unit 102 starts the imaging process at a time point when the mobile apparatus 100 starts traveling from a starting position. In the case where the mobile apparatus 100 is an electronic device capable of carrying an imaging device, the imaging unit 102 is included in the constituent elements of the imaging device mountable on the mobile apparatus 100.

The mobile unit 103 includes various members used for the travel of the mobile apparatus 100 (a plurality of propellers or wheels) so as to be able to move the mobile apparatus 100 to front, back, left, or right. If the mobile apparatus 100 is one that is capable of flying, the mobile unit 103 may also move up or down the mobile apparatus 100, or rotate the mobile apparatus 100. The mobile unit 103 is able to move the mobile apparatus 100 to front, back, left, or right, or cause the mobile apparatus 100 to move up or down, or rotate, by controlling the drive of the plurality of propellers or wheels in accordance with a control signal from the CPU 101.

The wireless communication unit 104 is able to wirelessly communicate with a wireless communication unit 202 of the control device 200. The wireless communication unit 104 is able to receive control signals generated by the CPU 201 of the control device 200 from the wireless communication unit 202. The control signals generated by the CPU 201 of the control device 200 are received by the wireless communication unit 104, and supplied to the CPU 101 by the wireless communication unit 104. The wireless communication unit 104 is also able to transmit display data generated by the display data generation unit 107 to the wireless communication unit 202.

The power supply unit 105 supplies power to the mobile apparatus 100 and imaging device. The power supply unit 105 is for example a rechargeable battery. The power supply unit 105 calculates remaining power left in the power supply unit 105 and supplies the power to the CPU 101.

The captured image processing unit 106 performs image processing (including image correction, noise reduction, and white balance adjustment) to the captured image data (video data) generated by the imaging unit 102. The captured image data processed by the captured image processing unit 106 is supplied to the display data generation unit 107 and storage unit 111. In the case where the mobile apparatus 100 is an electronic device capable of carrying an imaging device, the captured image processing unit 106 is included in the constituent elements of the imaging device mountable on the mobile apparatus 100.

The display data generation unit 107 generates display data presented on a display unit 203 of the control device 200. The display data includes at least one of captured image data (video data) processed by the captured image processing unit 106, and predetermined notification information. The predetermined notification information is supplied from the CPU 101 to the display data generation unit 107. The predetermined notification information includes, for example, any of the information for suggesting changing to a recommended imaging mode to the user, information for suggesting stopping an imaging process to the user, information indicating a change in the imaging mode of the imaging device to a recommended imaging mode, and information indicating termination of the imaging process. The predetermined notification information may include at least one piece of information for notifying the user of the remaining power of the power supply unit 105 being insufficient for traveling to a target position, or information for asking the user whether or not the captured image data is to be displayed on the display unit 203. The predetermined notification information may include information for notifying the user of how long the available travel distance or available travel time of the mobile apparatus 100 will be extended if the imaging unit 102 stops the imaging process. The display data generated by the display data generation unit 107 is supplied to the wireless communication unit 104.

The position information acquisition unit 108 acquires position information that indicates a current location of the mobile apparatus 100. The position information acquisition unit 108 is able to acquire position information indicative of the current location of the mobile apparatus 100 by a technique that uses GPS (Global Positioning System), for example. The position information acquisition unit 108 for example acquires position information at the starting position, and after the departure, acquires position information at predetermined time intervals. The predetermined time interval may be, for example, anything between 10 seconds to 1 minute. The predetermined time interval may be a time corresponding to a predetermined travel distance.

The travel distance acquisition unit 109 calculates a travel distance of the mobile apparatus 100. The travel distance of the mobile apparatus 100 corresponds to a distance covered by the mobile apparatus 100 from a starting position to the current location of the mobile apparatus 100. The travel distance of the mobile apparatus 100 is calculated for example based on the position information of the starting position, position information of the current location, and position information acquired by the position information acquisition unit 108 at predetermined time intervals.

Figure 3:
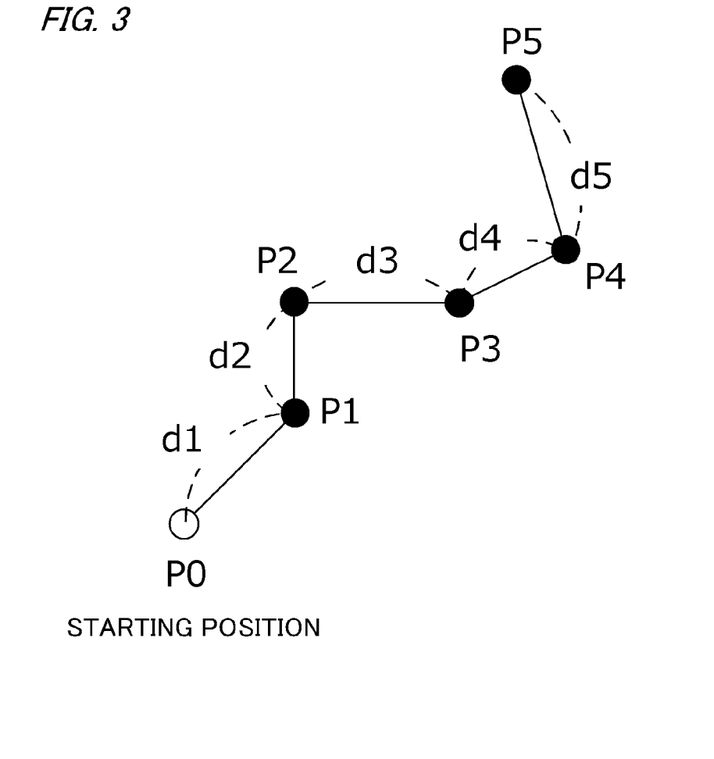
FIG. 3 is a block diagram for explaining a travel distance of the mobile apparatus 100 acquired by a travel distance acquisition unit 109.

A travel distance of the mobile apparatus 100 acquired by the travel distance acquisition unit 109 is explained with reference to FIG. 3. The white circle denotes a starting position P0, which indicates the position where the mobile apparatus 100 started traveling. Black circles indicate a plurality of calculation positions P1 to P5 where the travel distance acquisition unit 109 calculated the travel distance of the mobile apparatus 100. d1 denotes a difference in distance, which is a travel distance calculated by the travel distance acquisition unit 109 based on the position information acquired at the starting position P0 and the calculation position P1. When the current location of the mobile apparatus 100 is the calculation position P1, the travel distance acquisition unit 109 determines the acquired d1 as the travel distance of the mobile apparatus 100. d2 denotes a difference in distance, which is a travel distance calculated by the travel distance acquisition unit 109 based on the position information acquired at the calculation position P1 and the calculation position P2. When the current location of the mobile apparatus 100 is the calculation position P2, the travel distance acquisition unit 109 determines the acquired d1+d2 as the travel distance of the mobile apparatus 100. d3 denotes a difference in distance, which is a travel distance calculated by the travel distance acquisition unit 109 based on the position information acquired at the calculation position P2 and the calculation position P3. When the current location of the mobile apparatus 100 is the calculation position P3, the travel distance acquisition unit 109 determines the acquired d1+d2+d3 as the travel distance of the mobile apparatus 100. d4 denotes a difference in distance, which is a travel distance calculated by the travel distance acquisition unit 109 based on the position information acquired at the calculation position P3 and the calculation position P4. When the current location of the mobile apparatus 100 is the calculation position P4, the travel distance acquisition unit 109 determines the acquired d1+d2+d3+d4 as the travel distance of the mobile apparatus 100. d5 denotes a difference in distance, which is a travel distance calculated by the travel distance acquisition unit 109 based on the position information acquired at the calculation position P4 and the calculation position P5. When the current location of the mobile apparatus 100 is the calculation position P5, the travel distance acquisition unit 109 determines the acquired d1+d2+d3+d4+d5 as the travel distance of the mobile apparatus 100. The difference in distance d1, d2, d3, or d4 each corresponds to a distance covered by the mobile apparatus 100 during a predetermined time period.

The remaining distance acquisition unit 110 calculates a remaining distance, which is a distance from the current location of the mobile apparatus 100 to a target position. The position information indicating the current location of the mobile apparatus 100 is supplied to the remaining distance acquisition unit 110 by the position information acquisition unit 108. The position information of the target position is input to the CPU 201, for example, by a user via an operation unit 204. The CPU 201 supplies the position information of the target position to the wireless communication unit 202, and the wireless communication unit 202 transmits the position information of the target position to the mobile apparatus 100. The wireless communication unit 104 receives the position information of the target position from the wireless communication unit 202, and the remaining distance acquisition unit 110 receives the position information of the target position from the wireless communication unit 104. The position information of the target position is stored in a memory of the remaining distance acquisition unit 110. The target position may be the starting position of the mobile apparatus 100, or any of the plurality of calculation positions, or the current location of the control device 200. The current location of the control device 200 corresponds to the current location of the user operating the mobile apparatus 100 via the control device 200. The position information of the target position may be supplied to the remaining distance acquisition unit 110 before the mobile apparatus 100 departs from the starting position, or may be supplied to the remaining distance acquisition unit 110 after the mobile apparatus 100 has departed from the starting position.

The remaining distance acquisition unit 110 calculates a remaining distance based on, for example, the position information indicating the current location of the mobile apparatus 100, and the position information of the target position. The remaining distance may be a linear distance between the current location of the mobile apparatus 100 and the target position, or may be a distance calculated by multiplying the linear distance between the current location of the mobile apparatus 100 and the target position with a predetermined coefficient.

The storage unit 111 stores captured image data processed by the captured image processing unit 106 in a storage medium (such as a memory card, or hard disk device). The storage medium is for example a storage medium removable from the storage unit 111. In the case where the mobile apparatus 100 is an electronic device capable of carrying an imaging device, the storage unit 111 is included in the constituent elements of the imaging device mountable on the mobile apparatus 100.

The power consumption estimation unit 112 calculates power consumption per unit distance. The power consumption per unit distance is calculated, for example, based on an amount of power supplied by the power supply unit 105 to the imaging device and mobile apparatus 100 during the time when the mobile apparatus 100 traveled from the starting position to the current location of the mobile apparatus 100, and the travel distance of the mobile apparatus 100. The power consumption estimation unit 112 calculates the amount of power supplied by the power supply unit 105 to the imaging device and mobile apparatus 100 during the time when the mobile apparatus 100 traveled from the starting position to the current location of the mobile apparatus 100. The travel distance acquisition unit 109 calculates the travel distance of the mobile apparatus 100, and outputs the travel distance to the power consumption estimation unit 112. The amount of power supplied by the power supply unit 105 to the imaging device and mobile apparatus 100 during the time when the mobile apparatus 100 traveled from the starting position to the current location of the mobile apparatus 100 includes an amount of power consumed by the imaging unit 102, captured image processing unit 106, and mobile unit 103.

The power consumption estimation unit 112 calculates an estimated amount of power consumption based on the power consumption per unit distance and the remaining distance calculated by the remaining distance acquisition unit 110. The estimated amount of power consumption corresponds to the amount of power consumed by the imaging device and mobile apparatus 100 during the time when the mobile apparatus 100 travels from the current location of the mobile apparatus 100 to a target position. The estimated power consumption calculated by the power consumption estimation unit 112 is supplied by the power consumption estimation unit 112 to the CPU 101.

The CPU 101 is able to determine a recommended imaging mode for minimizing power consumption of the imaging device. The CPU 101 determines a recommended imaging mode different from a current imaging mode of the imaging device when a difference between the estimated power consumption calculated by the power consumption estimation unit 112 and the remaining power of the power supply unit 105 falls below a predetermined threshold. The predetermined threshold corresponds for example to an amount of power that allows the mobile apparatus 100 to travel for a predetermined period of time (e.g., 5 minutes) with the imaging process by the imaging unit 102 being stopped. The predetermined threshold may be zero. The predetermined threshold may be a value that can be changed by the user. The recommended imaging mode differs from the current imaging mode of the imaging device at least in one of image quality, frame rate, and angle of view. In the case where the image quality is different, the image quality of the recommended imaging mode is one grade or more lower than that of the current imaging mode. In the case where the frame rate is different, the frame rate of the recommended imaging mode is one grade or more lower (or slower) than that of the current imaging mode. In the case where the angle of view is different, the angle of view of the recommended imaging mode is one grade or more lower (or narrower) than that of the current imaging mode.

The CPU 101 determines a recommended imaging mode, in which the difference between the estimated power consumption calculated by the power consumption estimation unit 112 and the remaining power of the power supply unit 105 is equal to or more than the predetermined threshold. The CPU 101 has a memory storing a power consumption table, in which the power consumption per unit distance is registered for each of the imaging modes that can be set in the imaging device. The CPU 101 selects one of the imaging modes that can be set in the imaging device as a selected imaging mode. The CPU 101 calculates a difference (first difference) between an amount of power to be consumed if the mobile apparatus 100 travels the remaining distance in the current imaging mode, and an amount of power to be consumed if the mobile apparatus 100 travels the remaining distance in the selected imaging mode. The first difference is calculated based on the power consumption table and the remaining distance calculated by the remaining distance acquisition unit 110. The first difference corresponds to an amount of power consumption to be reduced if the mobile apparatus 100 travels the remaining distance in the selected imaging mode. The CPU 101 calculates a difference (second difference) between the estimated power consumption calculated by the power consumption estimation unit 112 and the remaining power of the power supply unit 105. The CPU 101 determines whether or not the value obtained by subtracting the second difference from the first difference is equal to or more than a predetermined threshold. If the value obtained by subtracting the second difference from the first difference is equal to or more than the predetermined threshold, the CPU 101 determines the selected imaging mode as a recommended imaging mode. If the value obtained by subtracting the second difference from the first difference is not equal to or more than the predetermined threshold, the CPU 101 determines another imaging mode as a new selected imaging mode. The CPU 101 repeats the above process to determine whether or not a new selected imaging mode can be determined as a recommended imaging mode. When a plurality of imaging modes are determined as a recommended imaging mode, the CPU 101 selects one as the recommended imaging mode in accordance with predetermined selection criteria. For example, the CPU 101 selects an imaging mode with a highest image quality, a highest frame rate, and a largest angle of view, within the ranges of image quality, frame rate, and angle of view of the current imaging mode, as a recommended imaging mode.

Figure 2:
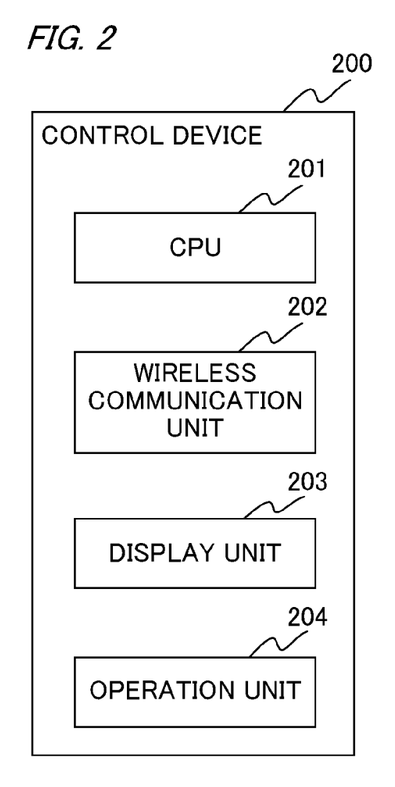
FIG. 2 is a block diagram for explaining a configuration example of a control device 200 in Embodiment 1.

FIG. 2 referred to next is a block diagram illustrating a configuration example of the control device 200 in Embodiment 1. The control device 200 is for example a controller for remotely controlling the mobile apparatus 100. The control device 200 is for example an electronic device operable as a smart phone or a tablet.

As illustrated in FIG. 2, the control device 200 includes a CPU (Central Processing Unit) 201, a wireless communication unit 202, a display unit 203, and an operation unit 204. Each constituent element of the control device 200 includes an electronic circuit that realizes one or a plurality of functions provided by each constituent element.

The CPU 201 is able to control all the constituent elements of the control device 200. For example, the CPU 201 includes a memory that stores programs, and a processor (or a micro computer) that controls all the constituent elements of the control device 200 by executing the programs stored in the memory. The CPU 201 can also generate control signals for controlling the mobile apparatus 100. The control signals generated by the CPU 201 are supplied to the wireless communication unit 202.

The wireless communication unit 202 is able to wirelessly communicate with the wireless communication unit 104 of the mobile apparatus 100. The wireless communication unit 202 is able to transmit the control signals generated by the CPU 201 to the wireless communication unit 104. The wireless communication unit 202 is also able to receive display data generated by the display data generation unit 107 of the mobile apparatus 100 from the wireless communication unit 104. The display data generated by the display data generation unit 107 of the mobile apparatus 100 is received by the wireless communication unit 202 and supplied to the display unit 203.

The display unit 203 has a display such as a liquid crystal display. The display unit 203 is able to display the display data generated by the display data generation unit 107 of the mobile apparatus 100. The display of the display data generated by the display data generation unit 107 allows for presentation of the predetermined notification information described above to the user who remotely controls the mobile apparatus 100 using the control device 200. The display unit 203 is also able to display the display data or notification information generated by the CPU 201. Presentation of the predetermined notification information is not limited to display on the display unit 203. The notification information may also be output as voice from a speaker of the control device 200.

The operation unit 204 is a user interface for receiving instructions from the user for remote control of the mobile apparatus 100. The instructions received by the operation unit 204 are sent to the CPU 201. The CPU 201 generates control signals for controlling the mobile apparatus 100 based on the instructions received by the operation unit 204.

Figure 4:
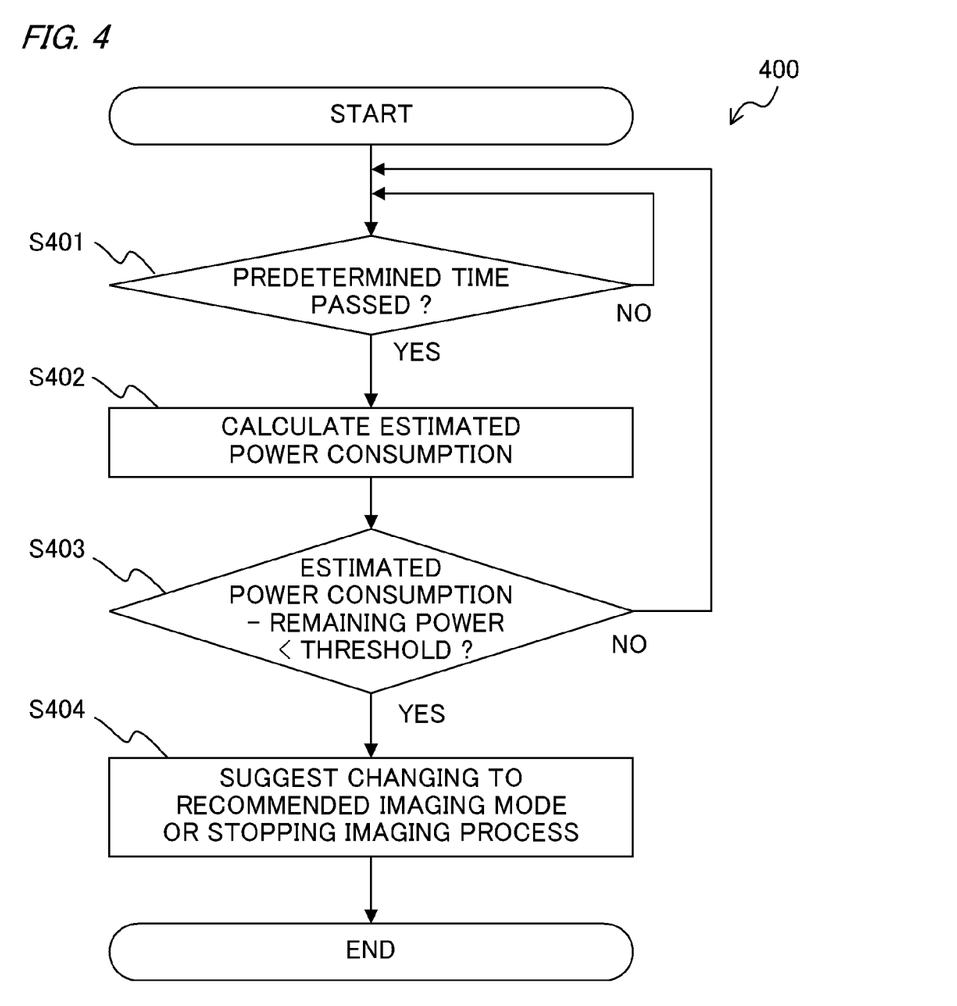
FIG. 4 is a flowchart for explaining a power consumption monitoring process 400 in Embodiment 1.

Next, a power consumption monitoring process 400 in Embodiment 1 will be described with reference to the flowchart of FIG. 4. The power consumption monitoring process 400 is a monitoring process that checks at predetermined time intervals whether or not a difference between estimated power consumption calculated by the power consumption estimation unit 112 and remaining power of the power supply unit 105 is below a predetermined threshold.

The power consumption monitoring process 400 is started when the mobile apparatus 100 starts traveling from a starting position. At step S401, the CPU 101 determines whether or not a predetermined time has passed from the time point when the travel started from the starting position or from an immediately previous calculation position. The predetermined time may be anything between 10 seconds to 1 minute as mentioned above. The predetermined time may be a time corresponding to a predetermined travel distance. If the predetermined time has passed (step S401: YES), the CPU 101 proceeds to step S402. If the predetermined time has not passed from the starting position or immediately previous calculation position (step S401: NO), the CPU 101 returns to step S401 and repeats the processing of step S401.

At step S402, the CPU 101 causes the power consumption estimation unit 112 to calculate an estimated power consumption. The power consumption estimation unit 112 calculates estimated power consumption based on power consumption per unit distance and remaining distance calculated by the remaining distance acquisition unit 110. The estimated power consumption corresponds to an amount of power consumed by the imaging device and mobile apparatus 100 during the time when the mobile apparatus 100 travels from the current location of the mobile apparatus 100 to a target position. The estimated power consumption calculated by the power consumption estimation unit 112 is supplied by the power consumption estimation unit 112 to the CPU 101.

At step S403, the CPU 101 acquires the remaining power of the power supply unit 105 from the power supply unit 105. The CPU 101 further determines whether or not the difference between the estimated power consumption calculated at step S402 and the remaining power of the power supply unit 105 is below a predetermined threshold. The predetermined threshold corresponds to an amount of power that allows the mobile apparatus 100 to travel for a predetermined period of time (e.g., 5 minutes) with the imaging process by the imaging unit 102 being stopped, as mentioned above. The predetermined threshold may be zero. The predetermined threshold may be a value that can be changed by the user. If the difference between the estimated power consumption calculated at step S402 and the remaining power of the power supply unit 105 is below the predetermined threshold (step S403: YES), the CPU 101 proceeds to step S404. When the difference between the estimated power consumption calculated at step S402 and the remaining power of the power supply unit 105 is below the predetermined threshold, the CPU 101 determines that the remaining power of the power supply unit 105 is not sufficient for the mobile apparatus 100 to travel to the target position. If, on the other hand, the difference between the estimated power consumption calculated at step S402 and the remaining power of the power supply unit 105 is not below the predetermined threshold (step S403: NO), the CPU 101 returns to step S401. When the difference between the estimated power consumption calculated at step S402 and the remaining power of the power supply unit 105 is not below the predetermined threshold, the CPU 101 determines that the remaining power of the power supply unit 105 is sufficient for the mobile apparatus 100 to travel to the target position.

At step S404, the CPU 101 determines a recommended imaging mode for minimizing power consumption of the imaging device. The recommended imaging mode is, as described above, an imaging mode in which the difference between the estimated power consumption calculated by the power consumption estimation unit 112 and the remaining power of the power supply unit 105 is equal to or more than the predetermined threshold. In the case where the CPU 101 was able to determine a recommended imaging mode, the CPU 101 supplies the display data generation unit 107 with predetermined notification information including information for suggesting changing to the recommended imaging mode to the user. In the case where the CPU 101 was not able to determine a recommended imaging mode, the CPU 101 supplies the display data generation unit 107 with predetermined notification information including information for suggesting stopping the imaging process to the user. The predetermined notification information may include at least one piece of information for notifying the user of the remaining power of the power supply unit 105 being insufficient for traveling to a target position, or information for asking the user whether or not the captured image data is to be displayed on the display unit 203. The predetermined notification information may include information for notifying the user of how long the available travel distance or available travel time of the mobile apparatus 100 will be extended if the imaging unit 102 stops the imaging process. The CPU 101 calculates how long the available travel distance or available travel time of the mobile apparatus 100 will be extended if the imaging unit 102 stops the imaging process.

At step S404, moreover, the display data generation unit 107 generates display data including the predetermined notification information supplied by the CPU 101, and supplies the generated display data to the wireless communication unit 104. The display data here may include captured image data (video data) processed by the captured image processing unit 106. The wireless communication unit 104 transmits the display data generated by the display data generation unit 107 to the control device 200. The wireless communication unit 202 receives the display data generated by the display data generation unit 107 from the wireless communication unit 104, and supplies the display data received by the wireless communication unit 104 to the display unit 203. The display unit 203 displays the display data generated by the display data generation unit 107. This way, the CPU 101 can present the predetermined notification information to the user who remotely controls the mobile apparatus 100 using the control device 200. The user, seeing the predetermined notification information shown on the display unit 203, can instruct the mobile apparatus 100 to change the imaging mode to a recommended imaging mode, or to stop the imaging process, using the control device 200.

Examples of display data generated by the display data generation unit 107 and displayed by the display unit 203 will now be described with reference to FIG. 5A to FIG. 5D. The display data shown in FIG. 5A does not include captured image data (video data), but includes notification information "Battery level is low. Change to low-quality mode". The notification information "Battery level is low. Change to low-quality mode" is one example of predetermined notification information, or one example of information for suggesting changing to a recommended imaging mode to the user. When the user, having seen the information suggesting changing to a recommended imaging mode to the user, inputs a change to the recommended imaging mode (low-quality imaging mode) to the operation unit 204, the CPU 201 generates a control signal for changing the imaging mode of the imaging device to the recommended imaging mode. The control signal for changing the imaging mode of the imaging device to the recommended imaging mode (low-quality imaging mode) is supplied to the CPU 101 via the wireless communication unit 202 and wireless communication unit 104. The CPU 101 then changes the imaging mode of the imaging device to the recommended imaging mode based on the control signal for changing the imaging mode of the imaging device to the recommended imaging mode (low-quality imaging mode).

Figure 5A:
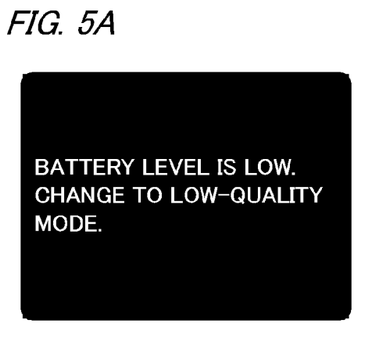
FIG. 5A to FIG. 5D are diagrams for explaining examples of display data presented on a display unit 203 of the control device 200.
Figure 5B:
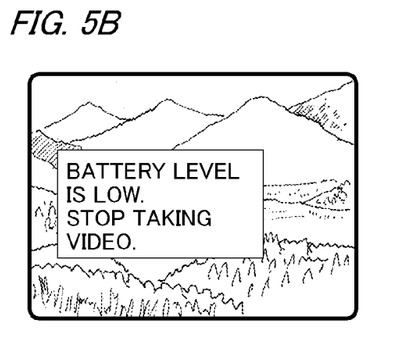

The display data shown in FIG. 5B includes captured image data (video data), as well as notification information "Battery level is low. Stop taking video". The notification information "Battery level is low. Stop taking video" is one example of predetermined notification information, or one example of information for suggesting stopping the imaging process to the user. When the user, having seen the information suggesting stopping the imaging process to the user, inputs an instruction to stop the imaging process to the operation unit 204, the CPU 201 generates a control signal for stopping the imaging process of the imaging unit 102. The control signal for stopping the imaging process of the imaging unit 102 is supplied to the CPU 101 via the wireless communication unit 202 and wireless communication unit 104. The CPU 101 stops the imaging process of the imaging unit 102 based on the control signal for stopping the imaging process of the imaging unit 102.

Figure 5C:
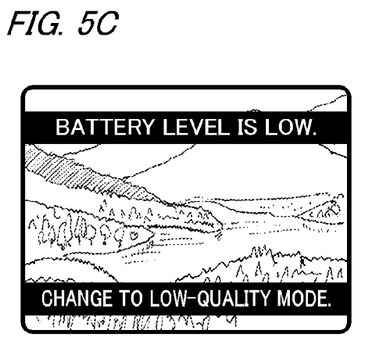

The display data shown in FIG. 5C includes captured image data (video data), as well as notification information "Battery level is low. Change to low-quality mode". The notification information "Battery level is low. Change to low-quality mode" is the same as the notification information shown in FIG. 5A. In the example of FIG. 5C, the predetermined notification information is displayed in strips at the top and bottom of the display unit 203 so as not to obscure the captured image data. When the user, having seen the information suggesting changing to a recommended imaging mode to the user, inputs a change to the recommended imaging mode (low-quality imaging mode) to the operation unit 204, the CPU 201 generates a control signal for changing the imaging mode of the imaging device to the recommended imaging mode. The control signal for changing the imaging mode of the imaging device to the recommended imaging mode (low-quality imaging mode) is supplied to the CPU 101 via the wireless communication unit 202 and wireless communication unit 104. The CPU 101 then changes the imaging mode of the imaging device to the recommended imaging mode based on the control signal for changing the imaging mode of the imaging device to the recommended imaging mode (low-quality imaging mode).

Figure 5D:
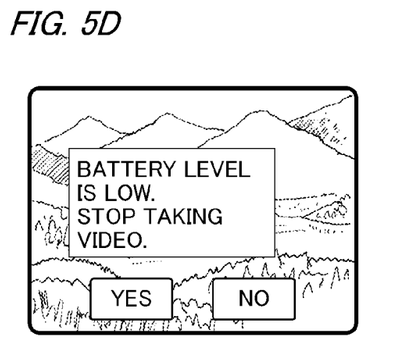

The display data shown in FIG. 5D includes captured image data (video data), as well as notification information "Battery level is low. Stop taking video". The notification information "Battery level is low. Stop taking video" is the same as the notification information shown in FIG. 5B. The "YES" and "NO" buttons shown in FIG. 5D are a user interface (GUI) controlled by the CPU 201 and shown on the display unit 203 together with the display data generated by the display data generation unit 107. When the user, having seen the information suggesting stopping the imaging process to the user, selects the "YES" button, the CPU 201 generates a control signal for stopping the imaging process of the imaging unit 102. The control signal for stopping the imaging process of the imaging unit 102 is supplied to the CPU 101 via the wireless communication unit 202 and wireless communication unit 104. The CPU 101 stops the imaging process of the imaging unit 102 based on the control signal for stopping the imaging process of the imaging unit 102.

The display data generated by the display data generation unit 107 and shown on the display unit 203 are not limited to the examples illustrated in FIG. 5A to FIG. 5D. The display data illustrated in FIG. 5A to FIG. 5D may contain information for notifying the user of the remaining power of the power supply unit 105 being insufficient for traveling to a target position. The display data illustrated in FIG. 5A to FIG. 5D may contain information for asking the user whether or not the captured image data is to be displayed on the display unit 203. For example, the display data illustrated in FIG. 5A and FIG. 5C may contain information for notifying the user of how long the available travel distance or available travel time of the mobile apparatus 100 will be extended if the imaging mode is changed. For example, the display data illustrated in FIG. 5B and FIG. 5D may contain information for notifying the user of how long the available travel distance or available travel time of the mobile apparatus 100 will be extended if the imaging unit 102 stops the imaging process. For example, the display data illustrated in FIG. 5A and FIG. 5C may contain information for suggesting reducing the frame rate or reducing the angle of view in addition to lowering the image quality.

As described above, in Embodiment 1, the mobile apparatus 100 is able to check at predetermined time intervals whether or not a difference between estimated power consumption calculated by the power consumption estimation unit 112 and remaining power of the power supply unit 105 is below a predetermined threshold. When the difference between the estimated power consumption calculated by the power consumption estimation unit 112 and the remaining power of the power supply unit 105 is below the predetermined threshold, the mobile apparatus is able to suggest changing to a recommended imaging mode or stopping the imaging process to the user. If the user instructs, via the control device 200, the mobile apparatus 100 to change the imaging mode to a recommended imaging mode, the mobile apparatus 100 is able to change the imaging mode of the imaging device to the recommended imaging mode so as to reduce the power consumption of the imaging device. In the case where the user instructs, via the control device 200, the mobile apparatus 100 to change the imaging mode to a recommended imaging mode, the power consumption of the imaging device is reduced, so that the mobile apparatus 100 is able to travel to the target position with the imaging device. If, on the other hand, the user instructs, via the control device 200, the mobile apparatus 100 to stop the imaging process, the mobile apparatus 100 is able to stop the imaging process of the imaging unit 102 so as to reduce the power consumption of the imaging device. In the case where the user instructs, via the control device 200, the mobile apparatus 100 to stop the imaging process, the power consumption of the imaging device is reduced, so that the mobile apparatus 100 is able to travel to the target position with the imaging device.

While the power supply unit 105 is a single rechargeable battery in the example described in Embodiment 1, the power supply unit 105 may contain a plurality of rechargeable batteries. In the case where the power supply unit 105 contains a plurality of rechargeable batteries, some of the rechargeable batteries may supply power to the imaging unit 102 and captured image processing unit 106, while the rest of the rechargeable batteries may supply power to the mobile unit 103.

Embodiment 2

In Embodiment 2, an example will be described in which the changing of an imaging condition to a recommended one or the stopping of the imaging process is carried out automatically when a difference between estimated power consumption calculated by the power consumption estimation unit 112 and remaining power of the power supply unit 105 is below a predetermined threshold.

Next, a power consumption monitoring process 600 in Embodiment 2 will be described with reference to the flowchart of FIG. 6. The power consumption monitoring process 600 is a monitoring process that checks at predetermined time intervals whether or not a difference between estimated power consumption calculated by the power consumption estimation unit 112 and remaining power of the power supply unit 105 is below a predetermined threshold. In Embodiment 2, when the difference between the estimated power consumption calculated by the power consumption estimation unit 112 and the remaining power of the power supply unit 105 is below the predetermined threshold, the imaging mode of the imaging device may be changed to a recommended imaging mode, or the imaging process of the imaging unit 102 may be stopped.

The processing from step S401 to step S403 of the power consumption monitoring process 600 is the same as the processing from step S401 to step S403 of the power consumption monitoring process 400 in Embodiment 1, and therefore the description thereof will be omitted. At step S403, however, if the difference between the estimated power consumption calculated at step S402 and the remaining power of the power supply unit 105 is below the predetermined threshold (step S403: YES), the CPU 101 proceeds to step S604. The predetermined threshold corresponds to an amount of power that allows the mobile apparatus 100 to travel for a predetermined period of time (e.g., 5 minutes) with the imaging process by the imaging unit 102 being stopped, as mentioned above. The predetermined threshold may be zero. The predetermined threshold may be a value that can be changed by the user.

At step S604, the CPU 101 determines a recommended imaging mode for minimizing power consumption of the imaging device. The recommended imaging mode is, as described above, an imaging mode in which the difference between the estimated power consumption calculated by the power consumption estimation unit 112 and the remaining power of the power supply unit 105 is equal to or more than the predetermined threshold. In the case where the CPU 101 was able to determine a recommended imaging mode, the CPU 101 changes the imaging mode of the imaging device to the recommended imaging mode, and supplies the display data generation unit 107 with predetermined notification information including information indicative of the change of the imaging mode of the imaging device to the recommended imaging mode. In the case where the CPU 101 was not able to determine a recommended imaging mode, the CPU 101 stops the imaging process of the imaging unit 102, and supplies the display data generation unit 107 with predetermined notification information including information indicative of the termination of the imaging process. The predetermined notification information may include at least one piece of information for notifying the user of the remaining power of the power supply unit 105 being insufficient for traveling to a target position, or information for asking the user whether or not the captured image data is to be displayed on the display unit 203. The predetermined notification information may include information for notifying the user of how long the available travel distance or available travel time of the mobile apparatus 100 will be extended if the imaging unit 102 stops the imaging process. The CPU 101 calculates how long the available travel distance or available travel time of the mobile apparatus 100 will be extended if the imaging unit 102 stops the imaging process.

At step S604, moreover, the display data generation unit 107 generates display data including the predetermined notification information supplied by the CPU 101, and supplies the generated display data to the wireless communication unit 104. The display data here may include captured image data (video data) processed by the captured image processing unit 106. The wireless communication unit 104 transmits the display data generated by the display data generation unit 107 to the control device 200. The wireless communication unit 202 receives the display data generated by the display data generation unit 107 from the wireless communication unit 104, and supplies the display data received by the wireless communication unit 104 to the display unit 203. The display unit 203 displays the display data generated by the display data generation unit 107. This way, the CPU 101 can present the predetermined notification information to the user who remotely controls the mobile apparatus 100 using the control device 200. The user, seeing the predetermined notification information shown on the display unit 203, can notify the mobile apparatus 100 via the control device 200 of the change of the imaging mode of the imaging device to the recommended imaging mode, or the termination of the imaging process.

Figure 6:
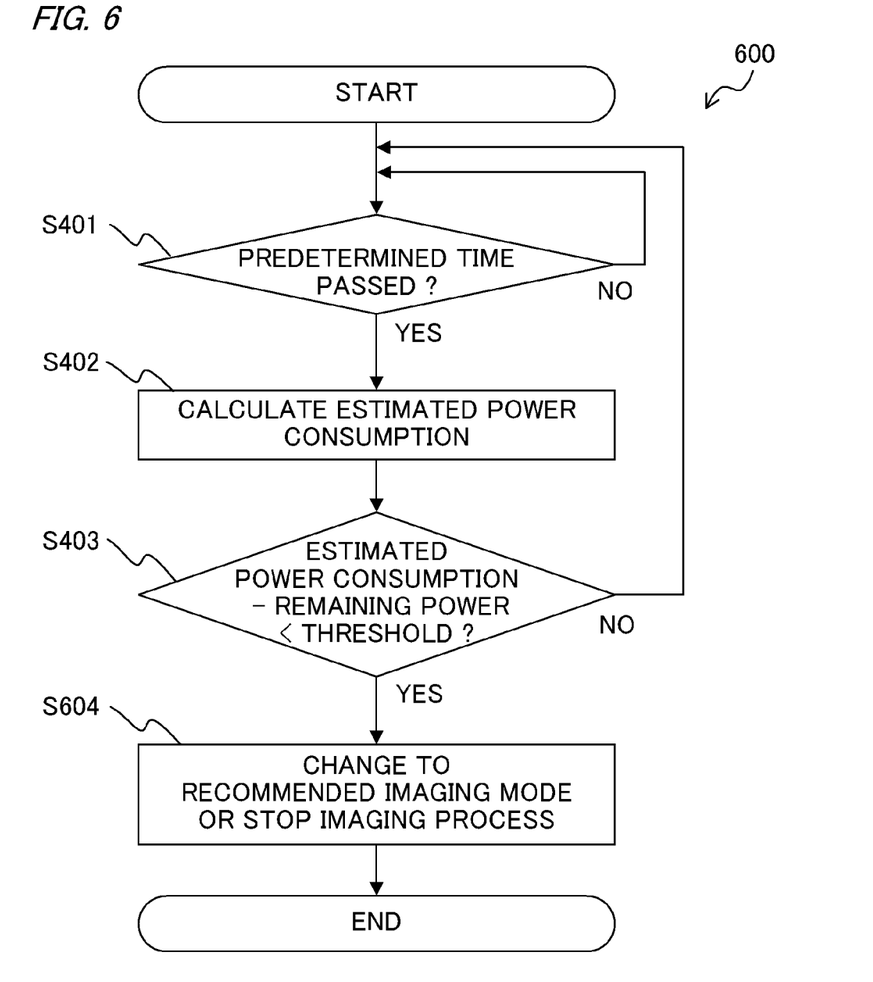
FIG. 6 is a flowchart for explaining a power consumption monitoring process 600 in Embodiment 2.

The difference between the estimated power consumption calculated by the power consumption estimation unit 112 and the remaining power of the power supply unit 105 may be compared to a plurality of thresholds instead of one threshold as in the example of FIG. 6. For example, the CPU 101 may change the imaging mode of the imaging device to a recommended imaging mode when the difference between the estimated power consumption calculated by the power consumption estimation unit 112 and the remaining power of the power supply unit 105 falls below a first threshold. The CPU 101 may stop the imaging process when the difference between the estimated power consumption calculated by the power consumption estimation unit 112 and the remaining power of the power supply unit 105 falls below a second threshold that is smaller than the first threshold. The first threshold may for example be an amount of power that allows the mobile apparatus 100 to travel for a predetermined period of time (e.g., 5 minutes) with the imaging process by the imaging unit 102 being stopped, and the second threshold may be half of the threshold 1, or zero.

As described above, in Embodiment 2, the mobile apparatus 100 may check at predetermined time intervals whether or not a difference between estimated power consumption calculated by the power consumption estimation unit 112 and remaining power of the power supply unit 105 is below a predetermined threshold. When the difference between the estimated power consumption calculated by the power consumption estimation unit 112 and the remaining power of the power supply unit 105 is below the predetermined threshold, the imaging mode of the imaging device may be automatically changed to a recommended imaging mode, or the imaging process of the imaging unit 102 may be automatically stopped. This reduces the power consumption of the imaging device, which enables the mobile apparatus 100 to travel to the target position with the imaging device.

Embodiment 3

In Embodiment 3, an example will be described in which the changing of an imaging condition to a recommended one or the stopping of the imaging process is suggested to the user, or the changing of an imaging condition to a recommended one or the stopping of the imaging process is carried out automatically, based on a first threshold and a second threshold.

Figure 7:
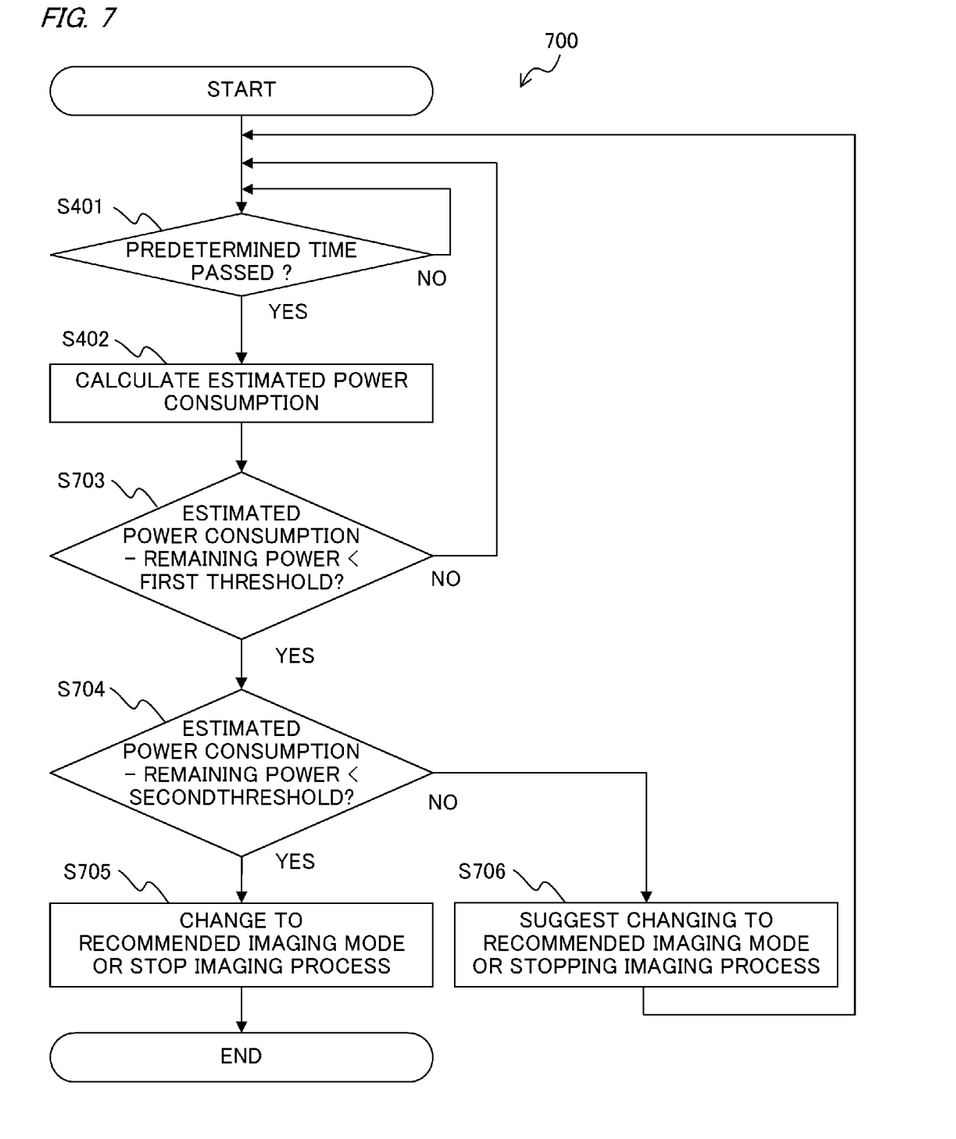
FIG. 7 is a flowchart for explaining a power consumption monitoring process 700 in Embodiment 3.

Next, a power consumption monitoring process 700 in Embodiment 3 will be described with reference to the flowchart of FIG. 7. The power consumption monitoring process 700 is a monitoring process that checks at predetermined time intervals whether or not a difference between estimated power consumption calculated by the power consumption estimation unit 112 and remaining power of the power supply unit 105 is below a predetermined threshold.

The processing at step S401 and step S402 of the power consumption monitoring process 700 is the same as the processing at step S401 and step S402 of the power consumption monitoring process 400 in Embodiment 1, and therefore the description thereof will be omitted.

At step S703, the CPU 101 acquires an amount of remaining power of the power supply unit 105 from the power supply unit 105. The CPU 101 further determines whether or not a difference between the estimated power consumption calculated at step S402 and the remaining power of the power supply unit 105 is below a first threshold. The first threshold corresponds to an amount of power that allows the mobile apparatus 100 to travel for a predetermined period of time (e.g., 5 minutes) with the imaging process by the imaging unit 102 being stopped. The first threshold may be a value that can be changed by the user. If the difference between the estimated power consumption calculated at step S402 and the remaining power of the power supply unit 105 is below the first threshold (step S703: YES), the CPU 101 proceeds to step S704. When the difference between the estimated power consumption calculated at step S402 and the remaining power of the power supply unit 105 is below the first threshold, the CPU 101 determines that the remaining power of the power supply unit 105 is not sufficient for the mobile apparatus 100 to travel to the target position. If, on the other hand, the difference between the estimated power consumption calculated at step S402 and the remaining power of the power supply unit 105 is not below the first threshold (step S703: NO), the CPU 101 returns to step S701. When the difference between the estimated power consumption calculated at step S402 and the remaining power of the power supply unit 105 is not below the first threshold, the CPU 101 determines that the remaining power of the power supply unit 105 is sufficient for the mobile apparatus 100 to travel to the target position.

At step S704, the CPU 101 determines whether or not the difference between the estimated power consumption calculated at step S402 and the remaining power of the power supply unit 105 is below a second threshold. The second threshold is smaller than the first threshold and corresponds to an amount of power that allows the mobile apparatus 100 to travel for a predetermined period of time (e.g., 2 minutes) with the imaging process by the imaging unit 102 being stopped. The second threshold may be zero. The second threshold may be a value that can be changed by the user. If the difference between the estimated power consumption calculated at step S402 and the remaining power of the power supply unit 105 is below the second threshold (step S704: YES), the CPU 101 proceeds to step S705. If, on the other hand, the difference between the estimated power consumption calculated at step S402 and the remaining power of the power supply unit 105 is not below the second threshold (step S704: NO), the CPU 101 proceeds to step S706.

At step S705, the CPU 101 determines a recommended imaging mode for minimizing power consumption of the imaging device. The recommended imaging mode is, as described above, an imaging mode in which the difference between the estimated power consumption calculated by the power consumption estimation unit 112 and the remaining power of the power supply unit 105 is equal to or more than the predetermined threshold. In the case where the CPU 101 was able to determine a recommended imaging mode, the CPU 101 changes the imaging mode of the imaging device to the recommended imaging mode, and supplies the display data generation unit 107 with predetermined notification information including information indicative of the change of the imaging mode of the imaging device to the recommended imaging mode. In the case where the CPU 101 was not able to determine a recommended imaging mode, the CPU 101 stops the imaging process of the imaging unit 102, and supplies the display data generation unit 107 with predetermined notification information including information indicative of the termination of the imaging process. The predetermined notification information may include at least one piece of information for notifying the user of the remaining power of the power supply unit 105 being insufficient for traveling to a target position, or information for asking the user whether or not the captured image data is to be displayed on the display unit 203. The predetermined notification information may include information for notifying the user of how long the available travel distance or available travel time of the mobile apparatus 100 will be extended if the imaging unit 102 stops the imaging process. The CPU 101 calculates how long the available travel distance or available travel time of the mobile apparatus 100 will be extended if the imaging unit 102 stops the imaging process.

At step S705, moreover, the display data generation unit 107 generates display data including the predetermined notification information supplied by the CPU 101, and supplies the generated display data to the wireless communication unit 104. The display data here may include captured image data (video data) processed by the captured image processing unit 106. The wireless communication unit 104 transmits the display data generated by the display data generation unit 107 to the control device 200. The wireless communication unit 202 receives the display data generated by the display data generation unit 107 from the wireless communication unit 104, and supplies the display data received by the wireless communication unit 104 to the display unit 203. The display unit 203 displays the display data generated by the display data generation unit 107. This way, the CPU 101 can present the predetermined notification information to the user who remotely controls the mobile apparatus 100 using the control device 200. The user, seeing the predetermined notification information shown on the display unit 203, can notify the mobile apparatus 100 via the control device 200 of the change of the imaging mode of the imaging device to the recommended imaging mode, or the termination of the imaging process.

At step S706, the CPU 101 determines a recommended imaging mode for minimizing power consumption of the imaging device. The recommended imaging mode is, as described above, an imaging mode in which the difference between the estimated power consumption calculated by the power consumption estimation unit 112 and the remaining power of the power supply unit 105 is equal to or more than the predetermined threshold. In the case where the CPU 101 was able to determine a recommended imaging mode, the CPU 101 supplies the display data generation unit 107 with predetermined notification information including information for suggesting changing to the recommended imaging mode to the user. In the case where the CPU 101 was not able to determine a recommended imaging mode, the CPU 101 supplies the display data generation unit 107 with predetermined notification information including information for suggesting stopping the imaging process to the user. The predetermined notification information may include at least one piece of information for notifying the user of the remaining power of the power supply unit 105 being insufficient for traveling to a target position, or information for asking the user whether or not the captured image data is to be displayed on the display unit 203. The predetermined notification information may include information for notifying the user of how long the available travel distance or available travel time of the mobile apparatus 100 will be extended if the imaging unit 102 stops the imaging process.

At step S706, moreover, the display data generation unit 107 generates display data including the predetermined notification information supplied by the CPU 101, and supplies the generated display data to the wireless communication unit 104. The display data may include captured image data (video data) processed by the captured image processing unit 106. The wireless communication unit 104 transmits the display data generated by the display data generation unit 107 to the control device 200. The wireless communication unit 202 receives the display data generated by the display data generation unit 107 from the wireless communication unit 104, and supplies the display data received by the wireless communication unit 104 to the display unit 203. The display unit 203 displays the display data generated by the display data generation unit 107. This way, the CPU 101 can present the predetermined notification information to the user who remotely controls the mobile apparatus 100 using the control device 200. The user, seeing the predetermined notification information shown on the display unit 203, can instruct the mobile apparatus 100 to change the imaging mode to the recommended imaging mode, or to stop the imaging process, using the control device 200.

As described above, in Embodiment 3, the mobile apparatus 100 is able to check at predetermined time intervals whether or not a difference between estimated power consumption calculated by the power consumption estimation unit 112 and remaining power of the power supply unit 105 is below a first threshold or a second threshold. When the difference between the estimated power consumption calculated by the power consumption estimation unit 112 and the remaining power of the power supply unit 105 is below the first threshold but not below the second threshold, the mobile apparatus can suggest changing to a recommended imaging mode or stopping the imaging process to the user. On the other hand, when the difference between the estimated power consumption calculated by the power consumption estimation unit 112 and the remaining power of the power supply unit 105 is below the first and second thresholds, the imaging mode of the imaging device may be changed to a recommended imaging mode, or the imaging process of the imaging unit 102 may be stopped. Here, the changing of the imaging mode of the imaging device to the recommended imaging mode, or the stopping of the imaging process of the imaging unit 102, is carried out automatically. This reduces the power consumption of the imaging device, which enables the mobile apparatus 100 to travel to the target position with the imaging device.

The number of thresholds used in the CPU 101 is not limited to two, and may be three or more. One case will be described wherein, for example, a third threshold is additionally set such that first threshold>third threshold>second threshold. When a difference between estimated power consumption calculated by the power consumption estimation unit 112 and remaining power of the power supply unit 105 falls below the first threshold, the CPU 101 notifies the user of the remaining power of the power supply unit 105 being insufficient for traveling to the target position. Next, when the difference between the estimated power consumption calculated by the power consumption estimation unit 112 and the remaining power of the power supply unit 105 falls below the third threshold, the CPU 101 suggests changing to a recommended imaging mode or stopping the imaging process to the user. When the difference between the estimated power consumption calculated by the power consumption estimation unit 112 and the remaining power of the power supply unit 105 falls below the second threshold, the CPU 101 automatically changes the imaging mode of the imaging device to a recommended imaging mode, or automatically stops the imaging process of the imaging unit 102. The first to third thresholds may for example be amounts of power that allow the mobile apparatus 100 to travel for 7, 5, and 2 minutes, respectively, with the imaging process by the imaging unit 102 being stopped. The first to third thresholds are not limited to preset values and may be changed by the user.

Embodiment 4

At least one of the various functions, processes, and methods described in the foregoing embodiments can be realized by a personal computer, micro computer, CPU, or micro processor executing a program. In Embodiment 4 below, personal computers, micro computers, CPUs, or micro processors will collectively be referred to as "computer X". In Embodiment 4, a program for controlling computer X and for realizing at least one of the various functions, processes, and methods described in the foregoing embodiments will be referred to as "program Y".

At least one of the various functions, processes, and methods described in the foregoing embodiments is realized by computer X executing program Y. In this case, program Y is supplied to computer X via a computer-readable storage medium. The computer-readable storage medium in Embodiment 4 includes at least one of a hard disk device, a magnetic storage device, an optical storage device, a magneto-optical storage device, a memory card, a volatile memory, and a non-volatile memory. The computer-readable storage medium in Embodiment 4 is a non-transitory storage medium.

The present disclosure enables minimization of power consumption of a mobile apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-107880, filed on Jun. 29, 2021, which is hereby incorporated by reference herein in its entirety.

What is claimed is:

1. An unmanned aerial vehicle traveling with an imaging device, comprising:
at least one memory and at least one processor which function as:

an estimation unit configured to estimate an amount of power consumed by the imaging device and the unmanned aerial vehicle during a time period in which the imaging device and the unmanned aerial vehicle travel from a current location to a target position; and a control unit configured to execute control to give a predetermined notification in a case where a difference between (a) a remaining amount of power of a power supply unit configured to supply power to the imaging device and the unmanned aerial vehicle and (b) an amount of power consumption estimated by the estimation unit falls below a first threshold, wherein the first threshold is an amount of power that allows the unmanned aerial vehicle to travel for a predetermined period of time with the imaging process by the imaging device being stopped.

2. The unmanned aerial vehicle according to claim 1, wherein the at least one memory and the at least one processor further function as a display unit configured to display the predetermined notification.

3. The unmanned aerial vehicle according to claim 1, wherein the predetermined notification includes information for suggesting changing an imaging mode to a user or information for suggesting stopping an imaging process to a user.

4. The unmanned aerial vehicle according to claim 3, wherein the information for suggesting changing an imaging mode to a user is information for suggesting changing an image quality, frame rate, or angle of view to the user.

5. The unmanned aerial vehicle according to claim 1, wherein the estimation unit estimates an amount of power consumed by the imaging device and the unmanned aerial vehicle based on an amount of power consumption per unit distance and a distance between the current location and the target position.

6. The unmanned aerial vehicle according to claim 1, wherein the control unit controls at least one of the imaging device and the unmanned aerial vehicle based on an instruction from a user in response to the predetermined notification.

7. The unmanned aerial vehicle according to claim 1, wherein the control unit executes control to reduce an amount of power consumed by the imaging device based on the remaining amount of power of the power supply unit and the amount of power consumption estimated by the estimation unit, in a case where a difference between the amount of power consumption and the remaining amount of power of the power supply unit falls below a second threshold that is smaller than the first threshold and larger than zero.

8. The unmanned aerial vehicle according to claim 7, wherein, in a case where a difference between the amount of power consumption and the remaining amount of power of the power supply unit falls below the first threshold, the control unit executes control to give a notification indicating a shortage of the remaining amount of power, and in a case where the difference falls below a third threshold that is smaller than the first threshold and larger than the second threshold, the control unit executes control to give a notification providing information for suggesting changing an imaging mode to a user or information for suggesting stopping an imaging process to a user.

9. The unmanned aerial vehicle according to claim 1, wherein the estimation unit estimates an amount of power consumed by the imaging device and the unmanned aerial vehicle during a time period in which the imaging device and the unmanned aerial vehicle travel to the target position every time a predetermined time passes.

10. A method for controlling an unmanned aerial vehicle that travels with an imaging device, the method comprising the steps of:

estimating an amount of power consumed by the imaging device and the unmanned aerial vehicle during a time period in which the imaging device and the unmanned aerial vehicle travel from a current location to a target position; and executing control to give a predetermined notification in a case where a difference between (a) a remaining amount of power of a power supply unit configured to supply power to the imaging device and the unmanned aerial vehicle and (b) the estimated amount of power consumption falls below a first threshold, wherein the first threshold is an amount of power that allows the unmanned aerial vehicle to travel for a predetermined period of time with the imaging process by the imaging device being stopped.

11. A non-transitory computer-readable medium that stores a program, wherein the program causes a computer to execute a control method of an unmanned aerial vehicle that travels with an imaging device, the control method comprising the steps of:

estimating an amount of power consumed by the imaging device and the unmanned aerial vehicle during a time period in which the imaging device and the unmanned aerial vehicle travel from a current location to a target position; and executing control to give a predetermined notification in a case where a difference between (a) a remaining amount of power of a power supply unit configured to supply power to the imaging device and the unmanned aerial vehicle and (b) the estimated amount of power consumption falls below a first threshold, wherein the first threshold is an amount of power that allows the unmanned aerial vehicle to travel for a predetermined period of time with the imaging process by the imaging device being stopped.

12. The unmanned aerial vehicle according to claim 5, wherein the amount of power consumption per unit distance is calculated using (1) a travel distance of the unmanned aerial vehicle acquired based on position information of a starting position of the unmanned aerial vehicle, position information of the current location and position information acquired at predetermined time intervals during a time when the unmanned aerial vehicle traveled from the starting position to the current location, and (2) an amount of power supplied to the imaging device and the unmanned aerial vehicle during the time when the unmanned aerial vehicle traveled from the starting position to the current location.

* * * * *